United States Patent [19]

Tate

[11] 3,724,544
[45] Apr. 3, 1973

[54] SECONDARY RECOVERY METHOD
[75] Inventor: Jack F. Tate, Houston, Tex.
[73] Assignee: Texaco Inc., New York, N.Y.
[22] Filed: June 21, 1971
[21] Appl. No.: 155,311

[52] U.S. Cl. .................166/271, 166/274, 166/275
[51] Int. Cl. ........................E21b 43/22, E21b 43/27
[58] Field of Search........252/8.55 D, 8.55 B, 8.55 C, 252/8.55 E; 166/273–275, 271, 307, 281

[56] References Cited
UNITED STATES PATENTS

| | | | |
|---|---|---|---|
| 2,094,479 | 9/1937 | Vandergrift | 166/271 UX |
| 2,802,531 | 8/1957 | Cardwell et al. | 166/307 X |
| 2,885,004 | 5/1959 | Perry | 166/271 X |
| 3,021,279 | 2/1962 | Scanley | 252/8.55 C |
| 3,429,824 | 2/1969 | Tate | 252/8.55 B |
| 3,483,923 | 12/1969 | Darley | 166/271 |
| 3,488,289 | 1/1970 | Tate | 252/8.55 B X |
| 3,502,587 | 3/1970 | Stanford et al. | 252/8.55 B X |
| 3,616,852 | 11/1971 | Allen | 166/271 |

Primary Examiner—Stephen J. Novosad
Attorney—Thomas H. Whaley et al.

[57] ABSTRACT

Significant improvement in the recovery of hydrocarbons from a subterranean hydrocarbon-bearing formation containing acid-soluble components is accomplished by injecting into the formation via an injection well drilled into a formation communicating with an adjacent producing well and containing acid-soluble components which may or may not have water-sensitive clays and shales included therein, an aqueous acidic solution of a phosphate ester of prescribed formula whereupon the acid component reacts with the acid-soluble components of the formation creating passageways or enlarging existing passageways thus facilitating the flow of fluids therein and the phosphate ester prevents post-precipitation of dissolved salts and thereby increases the recovery of hydrocarbons from the formation through the adjacent producing well.

23 Claims, No Drawings

SECONDARY RECOVERY METHOD

FIELD OF THE INVENTION

This invention relates to a method for the recovery of hydrocarbons from subterranean hydrocarbon-bearing formations containing acid-soluble components in which the permeability of the formation communicating between the producing well and adjacent injection well is increased by treating with an aqueous acidic solution of a phosphate ester of prescribed formula thereby facilitating the flow of fluids through the formation resulting in increased hydrocarbon recovery via the production well.

DESCRIPTION OF THE PRIOR ART

In recovering oil from oil-bearing reservoirs it usually is possible to recover only a minor part of the original oil in place by the primary recovery methods which utilize the natural forces present in the reservoir. As a result, a variety of supplemental recovery techniques have been utilized to increase the recovery of oil from subterranean hydrocarbon-bearing reservoirs or formations. Although these supplemental techniques are commonly referred to as secondary recovery operations in fact they may be primary or tertiary in sequence of employment. In such techniques, a fluid is introduced into the formation in order to displace the oil therein to a suitable production system through which the oil may be withdrawn to the surface of the earth. Examples of displacing media include gas, aqueous liquids such as fresh water or brine, oil-miscible liquids such as butane, or a water and oil-miscible liquid such as an alcohol. Generally, the most promising of the secondary recovery techniques is concerned with the injection into the formation of an aqueous flooding medium either alone or in combination with other fluids.

In the application of these conventional procedures for the production of hydrocarbons from similar formations by the secondary recovery method of water-injection, one of the principal difficulties that has been encountered is the generally low production response realized because of the low permeabilities and the consequent low rate of water acceptance of the communicating formation. Thus, these unfavorably low responses both in injection rate and in overall production have led to the abandonment of hydrocarbon production by water-injection methods from many carbonate formations after only a minimal amount of the oil-in-place has been produced.

One of the remedial measures that has been used frequently to increase water-injectivity in formations containing acid-soluble components is acid-treating of injection wells to improve the permeability surrounding the injection well bore, and thereby increasing the flow capabilities of the formation in the vicinity of the injection well bore. These measures, however, may result in only a temporary response in production improvement.

In acidizing an injection well utilizing the commonly employed procedure a non-oxidizing mineral acid, such as hydrochloric acid, is introduced into the injection well, and through the application of sufficient pressure is forced into the adjacent formation, where it reacts with the acid-soluble components, particularly the carbonates to dissolve them to form the respective salt of the acid, carbon dioxide and water, thereby increasing the permeability of the formation adjacent the bore of the injection well. The technique is not limited to application in formations of high acid solubility. Sandstone and gypsum-containing formations may require acidization if the injected water is unstable with respect to $CaCO_3$, $Fe(OH)_3$ or other salts.

If desired, the acidization may be carried out at an injection pressure sufficiently great to create fractures in the strata or formation which has the desired advantage of opening up passageways into the formation along which the acid can travel to more remote areas from the injection well bore. Conversely, fracturing a formation into which a displacing fluid is injected quite often is not desirable since sweep efficiency may be decreased and channelling occur. The salts formed upon neutralization of the acid are extensively water soluble and may pass through the formation dissoved in the displacing fluid.

There are, however, troublesome complications attending the use of hydrochloric acid, or other similar non-oxidizing mineral acids. In the acidizing process, the following primary beneficial reaction occurs:

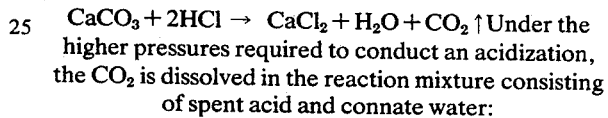

Under the higher pressures required to conduct an acidization, the $CO_2$ is dissolved in the reaction mixture consisting of spent acid and connate water:

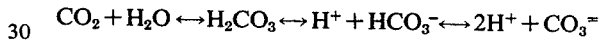

The equilibria may be summarized and written:

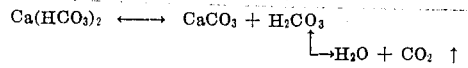

After acidization is complete, the well is often returned directly to injection, the reaction products of the dissolution being forced into the formation in a solution of the displacing fluid. As the fluid moves away from the well bore, pressure diminishes allowing dissolved gases such as $CO_2$ to break out of solution, inducing insoluble carbonates, such as $CaCO_3$ to post-precipitate Similarly, acid-dissolved iron salts may reprecipitate within the formation as hydrous iron oxides a distance from the well bore when pH rises due to exhaustion of the acid. In like manner, gypsum may precipitate if the injected fluid contains sulfate ion and if its temperature increases within the formation, since the sypsum has an inverse solubility relationship. Precipitation of this type when it occurs within the capillaries of a tight formation can severely lessen the injection rate by plugging such capillaries.

It is known that molecularly dehydrated polyphosphates are effective in retarding $CaCO_3$ precipitation. These polyphosphates are unsatisfactory in the method of the present invention because they undergo rapid hydrolysis in the presence of the mineral acid components. As a result, the scale inhibiting properties of these polyphosphates are destroyed. In addition, one hydrolytic reaction product, the phosphate ion ($PO_4^{-3}$), can precipitate with calcium $^{+2}$ or barium $^{+2}$ ions present in the produced water, causing additional plugging or scale deposition and further aggravating the problem. The socalled "glassy" phosphates are known scale inhibitors. However, these glassy phosphates are unsatisfactory because of their slight solubility in acidic media and the tendency to form objectionable hydrolytic reaction products.

It is also known to employ various organic polymers to prevent the precipitation of the mineral salts. Many of these polymeric materials are unstable in mineral acids. In such acidic media they undergo spontaneous depolymerization to an ineffective species. A representative polymeric material which undergoes hydrolysis in the presence of acids is polyacrylamide. In addition, this polymer has a further disadvantage in that it is unstable in aqueous media at temperatures of about 300°F. and upwards. Many wells that are being treated by the method of the present invention have bottom hole temperatures of 250–300°F. or higher.

The chemically altered natural polymers and natural polymers themselves, are effective inhibitors to prevent the precipitation of mineral salts. However, many of these materials such as sodium carboxymethylcellulose precipitate or decompose in the presence of mineral acids. Other known sequestering agents such as citric or tartaric acids, and/or complexing agents such as ethylenediaminetetraacetic acid and its water-soluble salts are known inhibitors to prevent the deposition of boiler scale in aqueous media. However, such materials are not applicable in the method of the present invention because they are not appreciably surface-active and do not absorb on the formation face.

The primary object of the present invention is to provide a method for the improved recovery of hydrocarbon fluids from subterranean fluid-bearing formations wherein a composition comprising an aqueous acidic solution of a phosphate ester of prescribed formula is injected into a formation communicating between a producing well and adjacent injection well, said formation containing acid-soluble components and in some instances also containing water-sensitive clays or shales, and whereafter the acid component of the said composition reacts with the acid-soluble components of the formation to increase permeability of the formation thereby facilitating the flow of fluids therethrough and the phosphate ester component prevents the post-precipitation of compounds formed by the reaction of the acidic component with the formation.

SUMMARY OF THE INVENTION

In accordance with the present invention, there is provided a new and improved method for the recovery of hydrocarbons from subterranean hydrocarbon-bearing formations in which there is injected into the formation via an injection well drilled into a formation communicating with an adjacent producing well and containing acid-soluble components which may or may not have water-sensitive clays included therein, a composition comprising an aqueous acidic solution of a phosphate ester of prescribed type which is capable of reacting with the acid-soluble components of the formation to increase the permeability thereof and the phosphate ester component prevents precipitation of compounds formed by the said reaction of the acid component thereby permitting a substantial increase of production of hydrocarbons from the formation via the production well.

An advantage resulting in treating subterranean hydrocarbon-bearing formations having acid-soluble components therein with the aqueous acidic solution of the phosphate ester is that the post-precipitation of acid-dissolved salts is prevented or materially decreased. Such post-precipitation whether it be of carbonates from evolution of $CO_2$ from solution, hydrous iron oxides from a rise in pH, or of gypsum from an increase in formation temperature, can lead to plugging of formation capillaries and a consequent reduction of permeability. Such an event can reduce injectivity and accordingly the rate of production from adjacent wells.

DESCRIPTION OF THE INVENTION

The method of the present invention in its broadest embodiment comprises introducing via an injection well drilled into a hydrocarbon-bearing formation containing acid-soluble components and communicating with a producing well a fluid composition comprising an aqueous acidic solution of a phosphate ester of prescribed formula in amounts sufficient to react with the formation so as to increase substantially the flow capability of the formation and to thereafter produce hydrocarbons from the said subterranean formation at an increased rate through the production well.

The phosphate ester useful in preparing the aqueous acidic compositions of the present invention has the general formula

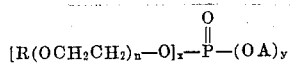

wherein R is a $C_6$–$C_{12}$ alkylphenyl radical or a $C_{12}$–$C_{18}$ alkyl radical, A is hydrogen or an alkali metal, $n$ is a number from 1 to 20, both $x$ and $y$ are 1 to 2 and the sum of $x$ and $y$ is 3, said ester having a molecular weight in the range of from about 500 to about 1,000.

The phosphate esters of the present invention can be prepared in a known manner such as for example by ethoxylation of alkylphenols and alkanols and phosphorylation of ethoxylated hydroxy compounds. Representative alkylphenols include the $C_6$–$C_{12}$ straight and branched chain alkylphenols such as the hexylphenols, octylphenols, nonylphenols, decylphenols and dodecylphenols and mixtures thereof. Representative alkanols include dodecanol, tridecanol, hexadecanol, octadecanol and mixtures of such alkanols. Mixtures of these alkylphenols and alkanols can be also satisfactorily used in the present invention such as a mixture of nonyphenol and tridecanol. The number of ethoxy groups in the ethoxylated alkyphenol or alkanol portion of the ester may vary from 1 to about 20. A preferred number is from about 6 to about 10. Formation of the phosphate esters of the present invention from the ethoxylated alkylphenols and alkanols can be carried out by known methods such as described in J. Am. Ch. Soc., 77, 5351; 81, 2094; and Chemiker-Ztg., 81, 72–75.

The corresponding salts of the phosphate esters can be prepared by neutralization of the esters with caustic soda or potassium hydroxide for example.

A preferred phosphate ester is an admixture of 40–60 percent by weight of the phosphate monoester and 60–40 percent by weight of the phosphate diester. A particularly preferred composition comprises about 55 percent by weight of nonylphenoxypolyethoxyethyl phosphate and about 45 percent by weight of di(nonylphenoxypolyethoxyethyl) phosphate wherein the polyethoxy moiety in each ester contains an average of about 9 ethylene oxide groups which correspond to the 10 ethylene oxide groups in the original ethoxylated hydroxy compound.

Another preferred mixed ethoxylated nonylphenol phosphate ester in a mixture of 40–60 percent monoester and 60–40 percent diester wherein each ester contains about 5 ethylene oxide groups in each polyethoxy moiety.

The preferred monoester derived from alkanol is a $C_{12}$–$C_{18}$ alkoxypolyethoxyalkyl phosphate wherein the alkoxy group is tridecoxy and the polyethoxy moiety is from 5 to 9 ethylene oxide groups. The corresponding diester contains similar esterifying groups and can be used in admixture with the aforesaid monoester.

Preferably, the acidic aqueous treating composition of this invention injected into the hydrocarbon-bearing formation comprises an aqueous solution of from about 3 to about 30 percent, preferably 5 to 28 percent, by weight of non-oxidizing mineral acid, such as hydrochloric acid, etc., which contains dissolved therein between about 0.1 to about 2.5 percent by weight, preferably 0.3 to 1.5 percent, based on the total solution weight of the phosphate ester.

The aqueous acidic solutions employed in the method of this invention, preferably contain an inhibitor to prevent or greatly reduce corrosion attack on metals. A variety of such inhibitors are known in the art, e.g., certain compounds of arsenic, nitrogen or sulfur as described by Grebe et al. in U.S. Pat. No. 1,877,504. Likewise, resin-amine type inhibitors, as illustrated in U.S. Pat. No. 2,758,970, may be utilized. A small but effective amount of the inhibitor is employed which generally ranges from about 0.02 percent to about 1.5 percent by weight of the aqueous solution.

In the first step of preparing the aqueous acidic composition of this invention, a solution containing from about 3 to about 30 percent by weight of a non-oxidizing mineral acid, such as hydrochloric acid, in water is prepared. An inhibitor to prevent corrosion on the metal equipment associated with the wells is usually added with mixing in the next step. The required amount of the phosphate ester is then admixed with the aqueous acid solution.

The method of this invention can be carried out with a wide variety of injection and production systems which will comprise one or more wells penetrating the producing strata or formation. Such wells may be located and spaced in a variety of patterns which are well-known to those skilled in the art. For example, the so-called "line flood" pattern may be used, in which case the injection and producing systems are composed of rows of wells spaced from one another. The recovery zone, i.e., that portion of the producing formation from which hydrocarbons are displaced by the drive fluid to the production system, in this instance will be that part of the formation underlying the area between the spaced rows. Another pattern which is frequently used is the so-called "circular flood" in which the injection system comprises a central injection well while the production system comprises a plurality of production wells spaced about the injection well. Likewise, the injection and production systems each may consist of only a single well and here the recovery zone will be that part of the producing strata underlying an elliptical-like area between the two wells which is subject to the displacing action of the aqueous drive fluid. For a more elaborate description of such recovery patterns reference is made to Uren, L.C., *Petroleum Production Engineering-Oil Field Exploitation*, Second Edition, McGraw Hill Book Company, Inc., New York, 1939, and to U.S. Pats. Nos. 3,472,318 and 3,476,182.

In carrying out the method of this invention, the aqueous acidic solution of the phosphate ester is forced, usually via a suitable pumping system, down the well bore of an injection well and into the producing formation through which it is then displaced together with hydrocarbons of the formation in the direction of a production well. As those skilled in the art will readily understand, the pressure employed is determined by the nature of the formation, viscosity of the fluid, and other operating variables. The acidization method of this invention may be carried out at a pressure sufficient merely to penetrate the formation or it may be of sufficient magnitude to overcome the weight of the overburden and create fractures in the formation. Propping agents, to prop open the fractures as created, for example 20 to 60 mesh sand, in accordance with known fracturing procedures, may be employed in admixture with the aqueous acidic solution containing the cited phosphate ester.

The formation may be treated continuously with the cited composition or such treatment may be temporary. If desired, however, after a time, conventional flooding may be resumed. The aqueous acidic solution of the phosphate ester also may be applied in a modified water flood operation in which there is first injected into the well bore a slug of the aqueous acidic solution of phosphate ester which is forced under pressure into the subterranean formation. The first step is then followed by a similar injection step wherein a slug of an aqueous drive fluid, such as water, is injected, which is thereafter followed by a repetition of the two steps. The sequence may be repeated to give a continuous cyclic process. The size of the slugs may be varied within rather wide limits and will depend on a number of conditions, including the thickness of the formation, its characteristics and the conditions for the subsequent injection of the aqueous drive medium.

In the method of this invention, the phosphate ester component of the composition provides means whereby ions produced by the reaction of the acid component with the formation having tendencies to precipitate as salts such as $CaCO_3$, hydrous iron oxides and $CaSO_4 \cdot 2H_2O$, combine with the phosphoric acid moiety to form a highly stable complex therewith so that solid salts do not precipitate from the spent treating solution. This binding up of the aforementioned ions from weakly ionizable compounds permits the formed ion-phosphoric acid ester complex to remain dissolved in the treating solution and pass through the formation pores. Further, the phosphate ester component of the composition provides means whereby the nucleation and growth of the solid itself is thwarted, so that solid salts do not precipitate from the spent treating solution. Finally, the phosphate ester component of the composition provides means whereby continuous protection against post-precipitation of salts is obtained for a considerable period of time subsequent to treatment due to continuous slow desorption of the component from the formation faces. In contrast, use of surfactants having merely dispersant and suspending properties and not possessing the capability of molecularly binding up these produced ions or thwarting the nucleation and growth of solid salts thereof will permit post-precipitation of said salts from such treating solution with the likelihood of plugging up the formation passageways during subsequent recovery of desirable formation hydrocarbons therethrough.

It should be understood that the concentration of the phosphate ester and the acid components of the composition are chosen to provide a displacing fluid of the desired rheological properties. Similarly, the appropriate phosphate ester is selected on the basis of the formation being treated as well as other operating conditions employed.

EXAMPLE I

Through a water injection well drilled into a limestone formation there is displaced under pressure down the tubing and into the formation an aqueous acidic solution containing 1 percent by weight based on the total weight of the solution of a phosphate ester sold under the trade name "Alkapent M-100," dissolved in a 15 percent by weight aqueous solution of hydrochloric acid. The pressure required to inject the required volume of water declines considerably and no increase in said pressure is noted subsequent to treatment indicating that post-precipitation of $CaCO_3$ within the formation leading to permeability reduction is prevented or materially lessened. The well is then returned to conventional water injection. After about 30 days the production of hydrocarbons from an adjacent producing well is substantially increased.

The phosphate ester of "Alkapent M-100" is a mixed ester consisting essentially of 50-60 percent by weight of a branched chain nonyphenoxypolyethoxyethyl phosphate and 30-40 percent of di (branched chain nonylphenoxypolyethoxyethyl) phosphate, the average polyethoxy group moiety being 9, the balance comprising up to 10 percent of the unreacted polyethoxynonylphenol and 2-4 percent phosphoric acid. The phosphorous content was 4.0-4.3 percent and the ester required about 1.3 and 2.4 milliequivalents of base, respectively, to a pH of 5.5 and 9.5, respectively.

EXAMPLE II

A flooding operation is carried out in an oil-containing reservoir in accordance with the process of this invention. Four injection wells are arranged in a rectangular pattern around a single centrally located production well in this system. A slug consisting of 75 barrels of an aqueous acidic solution containing 0.8 percent by weight, based on the total weight of the solution, of the same phosphate ester as Example I, in a 15 percent by weight aqueous solution of hydrochloric acid, is displaced via each of the four injection wells into the formation at a rate of about 50 bbl/day. In the next step, 100 barrels of water are injected under pressure into the producing formation through each injection well at a rate of about 55 bbl/day. This sequence of operations is repeated numerous times and the result is an increased injection rate of the drive streams into the injection wells and a subsequent increase in the rate of production of hydrocarbons via the production well.

EXAMPLE III

An injection well in a formation containing about 30 percent HCl soluble material is treated with 500 gallons of conventional 15 percent HCl followed by 1500 gallons of 15 percent HCl containing 1 percent by weight of the phosphate ester sold under the trade name "Alkapent M-60." The aqueous acidic phosphate ester composition is displaced from the tubing into the formation with lease water and the well shut-in for 24 hours. Thereafter the well is returned to water injection. The injectivity of the well is materially increased for a sustained period of time resulting in enhanced hydrocarbon recovery.

"Alkapent M-60" is a mixed ester having a composition similar to that of the ester of Example I, except that it contains an average of 6 ethylene oxide groups, the phosphorous content is 5.2-5.5 percent, the milliequivalents of base to pH 5.5 is 1.7, and to a pH of 9.5 is 3.0.

Obviously, many modifications and variations of the invention as hereinabove set forth may be made without departing from the spirit and scope thereof, and therefore only such limitations should be imposed as are indicated in the appended claims.

I claim:

1. A method for the recovery of hydrocarbons from a hydrocarbon-bearing formation containing acid-soluble components having at least one injection well and at least one production well penetrating the said formation and in fluid communication, which comprises displacing through the formation a composition comprising an aqueous acidic solution of a phosphate ester containing 3 to 30 percent by weight of a non-oxidizing mineral acid and 0.1 to 2.5 percent by weight of said phosphate ester, and recovering hydrocarbons through the production well, said phosphate ester having the general formula

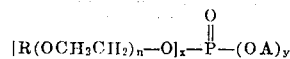

wherein R is a $C_6$-$C_{12}$ alkylphenyl radical or a $C_{12}$-$C_{18}$ alkyl radical, A is hydrogen or an alkali metal, $n$ is a number from 1 to 20, both $x$ and $y$ are 1 or 2 and the sum of $x$ and $y$ is 3, said ester having a molecular weight in the range of from about 500 to about 1,000.

2. Method as claimed in claim 1 wherein said ester is a monoester of phosphoric acid esterified with an ethoxylated nonylphenol containing from about 6 to 10 ethoxy groups.

3. Method as claimed in claim 1 wherein said ester is a diester of phosphoric acid esterified with an ethoxylated nonylphenol containing from about 6 to 10 ethoxy groups.

4. Method as claimed in claim 1 wherein said ester is a monoester of phosphoric acid esterified with an ethoxylated $C_{12}$-$C_{18}$ alkanol containing from about 6 to 10 ethoxy groups.

5. Method as claimed in claim 1 wherein said ester is a diester of phosphoric acid esterified with an ethoxylated $C_{12}$–$C_{18}$ alkanol containing from about 6 to 10 ethoxy groups.

6. Method as claimed in claim 1 wherein said ester is an admixture of a monoester and a diester of phosphoric acid esterified with an ethoxylated nonylphenol containing from 6 to 10 ethoxy groups.

7. Method as claimed in claim 1 wherein said ester consists essentially of a mixture of a monoester and a diester of phosphoric acid esterified with an ethoxylated $C_{12}$–$C_{18}$ alkanol containing from about 6 to 10 ethoxy groups.

8. Method as claimed in claim 1 wherein said ester comprises a mixture of 40–60 percent by weight of nonylphenoxypolyethoxyethyl phosphate and 60–40 percent by weight of di(nonylphenoxypolyethoxyethyl) phosphate, each polyethoxy moiety containing an average of about 5 ethoxy groups.

9. The method as claimed in claim 1 wherein the said ester is present in the composition in an amount of from about 0.3 to about 1.5 percent by weight.

10. The method as claimed in claim 1 wherein said acid is hydrochloric acid.

11. The method as claimed in claim 1 wherein said acid is sulfuric acid.

12. The method as claimed in claim 1 wherein the said ester is dissolved in about 5 to about 20 percent by weight solution of the mineral acid.

13. Method as claimed in claim 1 wherein the said solution is injected down the injection well bore penetrating said formation under a pressure greater than the formation pressure and sufficient to create fractures in the formation.

14. Method as claimed in claim 1 wherein the said solution is injected down the well bore penetrating said formation under a pressure greater than formation pressure but less than the pressure required to create fractures in the formation.

15. A method for the recovery of hydrocarbons from a hydrocarbon-bearing formation containing acid-soluble components and having at least one injection well and at least one production well penetrating the said formation in fluid communication which comprises displacing through the formation a slug of a composition comprising an aqueous acidic solution of a phosphate ester containing 3–30 percent by weight of a non-oxidizing mineral acid and 0.1 to 2.5 percent by weight of said phosphate ester, said phosphate ester having the general formula:

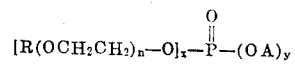

wherein R is a $C_6$–$C_{12}$ alkylphenyl radical or a $C_{12}$–$C_{18}$ alkyl radical, A is hydrogen or an alkali metal, $n$ is a number from 1 to 20, both $x$ and $y$ are 1 or 2 and the sum of $x$ and $y$ is 3, said ester having a molecular weight in the range of from about 500 to about 1,000, thereafter injecting a slug of an aqueous drive fluid into the formation to drive the said composition through the formation toward said production well and recovering hydrocarbons through the production well.

16. Method as claimed in claim 15 wherein said phosphate ester is a monoester of phosphoric acid esterified with an ethoxylated nonylphenol containing from about 6 to about 10 ethoxy groups.

17. Method as claimed in claim 15 wherein said phosphate ester is a diester of phosphoric acid esterified with an ethoxylated nonylphenol containing from about 6 to 10 ethoxy groups.

18. Method as claimed in claim 15 wherein said phosphate ester is a monoester of phosphoric acid esterified with an ethoxylated $C_{12}$–$C_{18}$ alkanol containing from about 6 to 10 ethoxy groups.

19. Method as claimed in claim 15 wherein said phosphate ester is a diester of phosphoric acid esterified with an ethoxylated $C_{12}$–$C_{18}$ alkanol containing from about 6 to 10 ethoxy groups.

20. Method as claimed in claim 15 wherein said phosphate ester is an admixture of a monoester and a diester of phosphoric acid esterified with an ethoxylated nonylphenol containing from 6 to 10 ethoxy groups.

21. Method as claimed in claim 15 wherein said ester consists essentially of a mixture of a monoester and a diester of phosphoric acid esterified with an ethoxylated $C_{12}$–$C_{18}$ alkanol containing from about 6 to 10 ethoxy groups.

22. Method as claimed in claim 15 wherein said ester comprises a mixture of 40–60 percent by weight of nonylphenoxypolyethoxyethyl phosphate and 60–40 percent by weight of di(nonylphenoxypolyethoxyethyl) phosphate, each polyethoxy moiety containing an average of about 5 ethoxy groups.

23. Method as claimed in claim 15 wherein said ester is present in the composition in an amount of from about 0.3 to about 1.5 percent by weight.

* * * * *